UNITED STATES PATENT OFFICE 2,426,012

GLUCOSIDAMINO COMPOUNDS OF ALKOXY PYRIDINE

Harris L. Friedman, New York, and Leo D. Braitberg, Yonkers, N. Y., assignors to Pyridium Corporation, Yonkers, N. Y., a corporation of New York No Drawing. Application November 14, 1945, Serial No. 628,674

4 Claims. (Cl. 260—211)

Our invention relates to and has for its object, a group of new chemical compounds which are more stable than the original base and hence are useful as intermediates in the production of dyes and other compounds, and some of which have therapeutic properties and are useful for devitalizing bacteria and rendering them harmless or innocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and the decomposition product may be toxic and deleterious, and their acid salts are generally too acid for injection purposes.

One of the objects of our invention, therefore, is to produce new compounds which, while possessing therapeutic properties, will have none of the mentioned, and other disadvantages of the corresponding basic compounds.

We have found that glucosidamino derivatives of these basic compounds possess highly therapeutic values over those of their corresponding basic compounds.

These therapeutic compounds of our invention are dry, stable powders and hence they can be administered in combination with food, in capsules, in tablet form or parenterally injected in the form of an aqueous solution, and they, therefore, possess highly valuable physical, stable and administrative properties over their corresponding basic compounds.

We have found, further, that these therapeutic compounds of our invention are particularly valuable in their effectiveness against *Mycobacterium tuberculosis*, although their usefulness is not limited to that particular disease, and that this effectiveness in the treatment of disease is greater than that possessed by the corresponding basic compounds.

We have found, further, that these therapeutic compounds of our invention are less toxic than the corresponding basic compounds, and that they also possess the additional unexpected property of being practically unaffected in their antibacterial action in the presence of such biological inhibitory substances as p-aminobenzoic acid, peptones, serum, pus, etc., which are present in living organisms, which substances seriously reduce the effectiveness of other compounds.

This action of these therapeutic compounds of our invention against *Mycobacterium tuberculosis* is particularly unexpected and remarkable as they are relatively without effect against other pathogenic organisms such as *E. coli, Staphylococcus aureus* and *Streptococcus pyogenes*.

Further, substances which were hitherto known to have activity against *Mycobacterium tuberculosis*, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue breakdown, play a very important role in the inhibition of sulfonamide and sulfone compounds, and as a result of this inhibitory mechanism, therapeutic trials on the whole failed.

The activity of therapeutic compounds of our invention against *Mycobacterium tuberculosis* is not diminished, when p-aminobenzoic acid, peptones, serum, pus, etc., are present. We have found that these compounds of our invention inhibit the growth of various strains of tuberculosis organisms in various dilutions, some diluted as high as one part to 25 million, depending upon the medium and strain of turberculosis organism used.

As these inhibitory substances are present in the tubercular host, it is impossible to produce the desired therapeutic effect with sulfonamide and sulfone compounds, and hence any compounds which would practically retain their bacteriostatic properties irrespective of the inhibitory substances present would be of the highest value.

This property of the therapeutic compounds included within our invention of being practically uninhibited in bacteriostatic effectiveness, and especially in bacteriostatic effect against *Mycobacterium tuberculosis*, is entirely unexpected and cannot be predicated upon any prior knowledge relative to previously known bacteriostatic compounds, and is of the greatest importance and value in the treatment of infection.

By "inhibitory substances" in our specification and claims, we mean those substances which prevent the bacteriostatic action normally manifested by compounds in their absence, but which do not inhibit the bacteriostatic activities of the therapeutic compounds of our invention.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The general formula of the compounds of our invention is

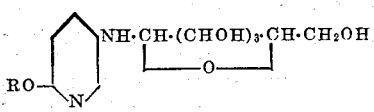

in which R represents a saturated or unsaturated alkyl radical with not more than eight carbon atoms such as ethyl-, propyl-, butyl-, amyl-, hexyl-, heptyl-, octyl-, isopropyl-, isobutyl-, secondary butyl-, tertiary butyl-, isoamyl-, diethylmethyl-, dipropylmethyl-, allyl-, methoxyethyl-, ethoxyethyl-, and butoxyethyl-, or saturated and unsaturated aryl radicals such as phenyl-, naphthyl-, benzyl-, betapyridyl-, furfuryl-, p-aminophenyl-, p-aminobenzyl-, cyclohexyl-, tetrahydrofurfuryl-, phenyloxyethyl-, and benzyloxyethyl-.

The general formula for the basic compounds from which we produce the compounds of our invention is:

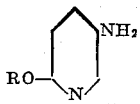

in which R represents a saturated or unsaturated alkyl radical with not more than eight carbon atoms, or a saturated or unsaturated aryl radical.

In producing our new compounds we react the free amine with glucose in an absolute alcohol, in the presence of a small quantity of ammonium chloride and recrystallize the resulting product from an absolute alcohol or other indifferent solvent.

The following are examples of our processes for the production of the indicated compounds of our invention.

Example I 2.76 grams of 2-ethoxy, 5-aminopyridine were placed into a flask containing 3.96 grams of glucose, 50 milligrams of ammonium chloride and 65 ccs. of isopropanol. The reaction mixture was then refluxed for one and a half hours. After cooling the precipitate was collected and recrystallized from 200 ccs. of isopropanol. The white crystalline product is 2-ethoxy, 5-gluecosidaminopyridine.

Example II 16.6 grams of 2-butoxy, 5-aminopyridine were placed into a flask containing 19.8 grams of glucose, 0.2 gram of ammonium chloride, 15 ccs. of methanol and 250 ccs. of isopropanol. The reaction mixture was then refluxed under stirring for two and a half hours. After one hour all the glucose was in solution. When the refluxing was stopped the mixture was boiled up with charcoal and filtered. The filtrate was cooled well and the precipitate collected on a filter and washed with absolute ethanol. The collected precipitate was recrystallized from absolute ethanol. The pure product, 2-butoxy, 5-glucosidaminopyridine forms white crystals, its melting point is 137–137.5° C. On analysis it was found to contain N:8.53%; theory: 8.55%.

Example III 3.98 grams of 2-hexyloxy, 5-aminopyridine were placed into a flask containing 3.96 grams of glucose, 50 milligrams of ammonium chloride and 50 ccs. of isopropanol. After refluxing for two and a half hours, the dark colored solution was boiled up with charcoal and filtered. On cooling a tan colored precipitate came out, which was collected on a filter, and twice recrystallized with addition of charcoal, from isopropanol. The product so obtained, 2-hexyloxy, 5-glucosidaminopyridine, forms white crystals. Its melting point is 132–132.5° C. On analysis was found N:7.67%; theory 7.94%.

Example IV 3.6 grams of 2-isoamyloxy, 5-aminopyridine were placed into a flask containing 3.96 grams of glucose, 50 milligrams of ammonium chloride and 70 ccs. of isopropanol. After refluxing for two and a half hours, complete solution was obtained but on cooling no crystals came out. The solution was concentrated and boiled up with charcoal, filtered and cooled. The product, 2-isoamyloxy, 5-glucosidaminopyridine came out in white crystalline form. Its melting point is 123.5–124° C. On analysis was found N:8.32%; theory 8.19%.

Example V 2.0 grams of 2-allyloxy, 5-aminopyridine were placed into a flask containing 3.0 grams of glucose, 50 milligrams of ammonium chloride and 25 ccs. of isopropanol. The reaction mixture was refluxed for two and a half hours, when all the glucose went into solution. The mixture was then cooled and the tan colored crystals collected on a filter were recrystallized out of isopropanol. The product 2-allyloxy, 5-glucosidaminopyridine forms white crystals. Its melting point is 156–157° C. On analysis was found N:8.76%; theory 8.97%.

Example VI 3.4 grams of 2-methoxyethoxy, 5-aminopyridine were placed into a flask containing 3.9 grams of glucose, 50 milligrams of ammonium chloride and 50 ccs. of absolute ethanol. The reaction mixture was refluxed until complete solution was obtained. The solution was then poured into 500 ccs. of absolute ether and cooled. The light brown colored precipitate was collected and recrystallized from isopropanol. The white, crystalline 2-methoxyethoxy, 5-glucosidaminopyridine was analyzed for N:8.34%; theory 8.45%. Melting point 128–130° C.

The products formed as described in the foregoing examples are similar in their characteristics. They are generally of white crystalline or powder form and are all very soluble in water.

The activity of some of the compounds included in our invention against *Mycobacterium tuberculosis* are tabulated below. The figures indicate the highest dilution that still inhibits the growth of *Mycobacterium tuberculosis* under a particular set of experimental conditions as regards inoculum, culture, etc., thereby making a comparable series.

| Name of compound | Highest dilution showing bacteriostasis |
|---|---|
| 2-ethoxy, 5-glucosidaminopyridine | 1/25,000 |
| 2-butoxy, 5-glucosidaminopyridine | 1/1,600,000 |
| 2-hexyloxy, 5-glucosidaminopyridine | 1/1,600,000 |
| 2-isoamyloxy, 5-glucosidaminopyridine | 1/100,000 |
| 2-allyloxy, 5-glucosidaminopyridine | 1/200,000 |
| 2-methoxyethoxy, 5-glucosidaminopyridine | 1/50,000 |

The therapeutic compounds of our invention, therefore, present highly valuable and unexpected bacteriostatic properties especially against such bacteria as cause tubercular infections, although their usefulness is not limited to that particular disease.

We do not limit ourselves to the specific limitations mentioned, as these are given solely for the purpose of clearly describing our invention as set forth herein.

What we claim is:

1. Compounds having the general formula:

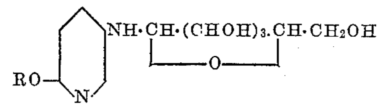

in which R is a member selected from the group consisting of aliphatic hydrocarbon radicals with not more than eight carbon atoms.

2. 2-butoxy, 5-glucosidaminopyridine.
3. 2-hexyloxy, 5-glucosidaminopyridine.
4. 2-allyloxy, 5-glucosidaminopyridine.

HARRIS L. FRIEDMAN.
LEO D. BRAITBERG.